United States Patent Office 2,904,582
Patented Sept. 15, 1959

2,904,582

ALKYLAROMATIC (SULFOTHIO) ACETATES

Van R. Gaertner, Dayton, Ohio, assignor to Monsanto Chemical Company, St. Louis, Mo., a corporation of Delaware No Drawing. Application December 21, 1956
Serial No. 629,804

7 Claims. (Cl. 260—479)

The present invention relates to organic sulfur compounds having surface active properties.

According to the invention there are prvided (sulfothio) acetates of the formula

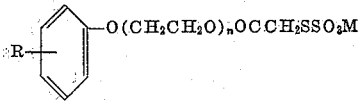

in which R is an alkyl radical of from 8 to 18 carbon atoms, $n$ is an integer of from 0 to 22, and M is selected from the class consisting of alkali metal and ammonium.

The present (sulfothio)acetates are readily prepared according to the invention by the reaction of (1) an inorganic thiosulfate selected from the class consisting of alkali metal and ammonium thiosulfate and (2) haloacetates of the formula

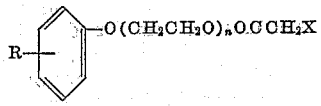

in which R is an alkyl radical of from 8 to 18 carbon atoms and $n$ is an integer of from 0 to 22, and X is halogen.

Haloacetates employed according to the invention in the reaction with the inorganic thiosulfates are obtained by the reaction of a haloacetic acid, its acyl halide or anhydride with an alkylphenol having from 8 to 18 carbon atoms in the alkyl radical or the ethylene oxide addition products of said phenols. Reaction of the haloacetates with the inorganic thiosulfates takes place according to the scheme:

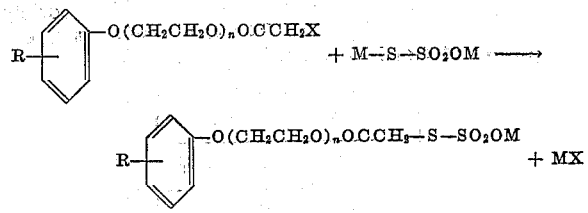

One class of chloroacetates which I employ in the reaction with the alkali metal or ammonium thiosulfates for the preparation of the present (sulfothio) acetates has the formula

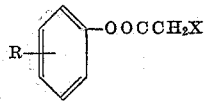

in which R is as herein defined. This includes, e.g., 4-n-octylphenyl chloroacetate, (2-ethylhexyl)phenyl bromoacetate, an isomeric mixture of non-nonylphenyl iodoacetates, 2-, 3-, or 4-decyl-phenyl chloroacetate, 2-, 3-, or 4-undecylphenyl bromoacetate, ar-(5-ethylnonyl)phenyl chloroacetate, ar-(2,6,8-trimethylnonyl)phenyl chloroacetate, ar-tridecylphenyl bromoacetate wherein the tridecyl radical is a primary, branched chain radical, 4-n-dodecylphenyl iodoacetate a mixture of isomeric branched chain dodecylphenyl bromoacetates wherein the dodecyl radical is derived from propylene tetramer or butylene trimer, ar-(7-ethyl-2-methylundecyl)-phenyl chloroacetate, ar-pentadecylphenyl bromoacetate, 4-hexadecylphenyl chloroacetate, 2-octadecylphenyl chloroacetate, etc. The (sulfothio)acetates obtained from the presently useful higher alkylphenyl haloacetates and the alkali metal or ammonium thiosulfate are, e.g., sodium 2-, 3-, or 4-tert-octylphenyl (sulfothio)acetate, a mixture of isomeric potassium nonylphenyl (sulfothio)acetates, ammonium 2-, 3-, or 4-decylphenyl (sulfothio)acetate, lithium 2-, 3-, or 4-(2-ethylhexyl)phenyl (sulfothio)acetate, sodium 2-, 3-, or 4-decylphenyl (sulfothio)acetate, sodium 2-, 3-, or 4-tert-dodecylphenyl (sulfothio) acetate, sodium 2-, 3-, or 4-dodecylphenyl (sulfothio)acetate wherein the dodecyl radical is either straight chained or branched, sodium 2-, 3-, or 4-tridecylphenyl (sulfothio) acetate wherein the tridecyl radical is derived from an "Oxo" process, branched chain tridecyl alcohol, potassium 2-, 3-, or 4-n-tetradecylphenyl (sulfothio)acetate, ammonium 2-, 3-, or 4-(7-ethyl-2-methylundecyl)phenyl (sulfothio)acetate, sodium 2-, 3-, or 4-pentadecylphenyl (sulfothio)acetate, sodium 2-, 3-, or 4-hexadecylphenyl (sulfothio)acetate, potassium 2-, 3-, or 4-octadecylphenyl (sulfothio)acetate, etc.

Another class of esters which I employ in the reaction with the alkali metal or ammonium thiosulfate for the preparation of the present (sulfothio)acetates has the formula:

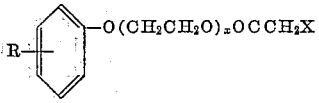

in which R and X are as herein defined and $x$ is an integer of from 1 to 22. This includes the 2-(alkylphenoxy)ethyl haloacetates which are obtainable from a haloacetic acid or an acyl halide or anhydride thereof and the 2-(alkylphenoxy)ethanols which are prepared by the addition reaction of 1 mole of the appropriate alkylphenol with one mole of ethylene oxide. It also includes the (alkylphenoxy)polyethyleneoxyethyl haloacetates obtainable by the reaction of a haloacetic acid or an acyl halide or anhydride thereof with the (alkylphenoxypolyethyleneoxy)ethanols prepared by the addition reaction of one mole of the appropriate phenol with from 2 to 22 moles of ethylene oxide. The (sulfothio)acetates obtainable therefrom have the formula:

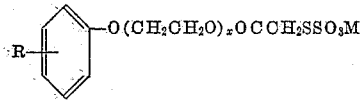

in which R, $x$ and M are as herein defined.

Because the addition reaction of ethylene oxide with alkylphenols is a chain reaction whereby the 1:1 molar addition product adds to another mole of ethylene oxide to form a 1:2 alkylphenol-ethylene oxide adduct, and the 1:2 adduct then reacts with another mole of the oxide to form a 1:3 alkylphenol-ethylene oxide adduct, the addition reaction continuing in this manner with each higher adduct as it is formed, the product obtainable from an alkylphenol and ethylene oxide, depending to some extent upon the amount of ethylene oxide employed in the reaction, consists of a mixture of hydroxy ethers. Thus, when the alkylphenol has reacted with, say, ten moles of the ethylene oxide, the product is not merely the 1:10 alkylphenol-ethylene oxide adduct, but a mixture of adducts in which the average number of ethoxy groups present is 10. Hence, of necessity, $x$ in the above formula refers to the average number of ethyleneoxy radicals present in the mixture of alkylphenol-ethylene oxide products.

For convenience, the (sulfothio)acetates prepared from the ethyleneoxy-containing chloroacetates will be referred to as alkylphenol-E.O. sulfothioacetates, wherein E.O. denotes the average number of moles of ethylene oxide which have added to the alkylphenol. As illustrative of ethyleneoxy-containing (sulfothio) acetates provided by the present invention may be mentioned, e.g., sodium 2-, 3-, or 4-tert-octylphenyl-5 E.O. (sulfothio)acetate, 2-, 3-, or 4, sodium 2-, 3-, or 4-n-dodecylphenyl-7.5 E.O. (sulfothio)acetate, potassium 2-, 3-, or 4-branched chain nonylphenyl-10 E.O. (sulfothio)acetate, 2-, 3-, or 4-(2-ethylhexylphenyl)-15 E.O. (sulfothio)acetate, sodium 2-, 3-, or 4-tridecylphenyl-16.8 E.O. (sulfothio)acetate wherein the tridecyl radical is derived from an "Oxo" process tridecyl alcohol, sodium salt of a mixture of isomeric branched chain dodecylphenyl-8 E.O. (sulfothio)acetates wherein the dodecyl radical is derived from triisobutylene, lithium tetradecylphenyl-22 E.O. (sulfothio)acetate, ammonium pentadecylphenyl-10 E.O. (sulfothio)acetate, potassium hexadecylphenyl-2 E.O. (sulfothio)acetate, sodium octadecylphenyl-4 E.O. (sulfothio)acetate, etc.

The inorganic thiosulfates which I employ in the reaction with the alkyl phenyl or alkylphenol-E.O. chloroacetates to prepare the present carboxylated thiosulfates are sodium thiosulfate, potassium thiosulfate, lithium thiosulfate and ammonium thiosulfate.

Reaction of the presently useful chloroacetates with said inorganic thiosulaftes takes place readily by contacting a mixture of the two reactants at ordinary or increased temperatures and preferably at a temperature of from, say, 50° C. to 100° C. in the presence of an inert diluent or solvent. Refluxing temperatures are preferred. A condensation catalyst, e.g., sodium or potassium iodide, may or may not be employed. For smooth reaction a liquid solvent is generally recommended. Conveniently, this may be a mixture of solvents for the inorganic and organic constituents of the reaction mixture, e.g. a mixture of water and an organic liquid such as ethanol, isopropanol, benzene, acetone, ethyl ether, etc. The by-product alkali metal or ammonium chloride is readily removed from the reaction mixture either by decantation and/or alternate concentration, dissolution and precipitation. Alternative procedure involves extraction of the (sulfothio)-acetate with an organic solvent such as isopropanol, acetone, chloroform or tetrahydrofuran, stripping off the solvent from the extract, and final oven- or spray drying.

The present (sulfothio)acetates are well defined, stable compounds which range from liquid to waxy or crystalline solids. While they may be advantageously employed for a variety of commercial and agricultural purposes, they are particularly valuable as wetting-out, cleansing and lathering agents. Aqueous solutions of very small amounts of the present (sulfothio)acetates foam in both hard and soft water and the lather thus produced has very good stability. They are thus very useful as dishwashing agents wherein foam-stability is of major concern. Surprisingly, there is a significant difference in the wetting-out and detersive properties, depending upon whether or not they were derived from the ethylene oxide addition products. The present alkylphenyl (sulfothio)-acetates are characterized by extremely good wetting-out ability, but their detersive effect is not very remarkable. On the other hand, those of the products which possess the ethyleneoxy radicals are extremely efficient detersive and emulsifying agents.

The invention is further illustrated, but not limited, by the following examples:

*Example 1*

To 220 g. (1 mole) of a commercially available mixture of isomeric, branched chain nonylphenols there was added, dropwise and with stirring 125 g. (1.10 mole) of chloroacetyl chloride and the whole was heated at a temperature of 105° C.–110° C. for 3 hours and then at 155° C.–160° C. for another 3 hours. The reaction mixture was then cooled and diluted with water and hexane. The resulting organic layer was washed twice with water, treated with potassium carbonate, and dried over a sodium sulfate-potassium carbonate mixture. Distillation of the resulting reaction mixture gave 263.4 g. (88.7% theoretical yield) of the substantially pure nonylphenyl chloroacetate, B.P. 156–163° C./0.4–0.7 mm.

Said chloroacetate was converted to the (sulfothio)-acetate as follows: A mixture consisting of 89.1 g. (0.3 mole) of the above nonylphenyl chloroacetate, 86.8 g. (0.35 mole) of sodium thiosulfate hydrate, 200 ml. of ethanol and 200 ml. of water was gradually heated, with stirring, to a temperature of 80° C. and maintained there for fifteen minutes. The resulting reaction mixture was then dried by distilling off the water and ethanol at reduced pressure while replacing them with isopropanol. During this procedure the distillation was interrupted twice in order to filter off the salts which precipitated out. Further distillation gave as residue a thick, gum-like product consisting chiefly of sodium ar-nonylphenyl (sulfothio)acetate. Complete removal of the isopropanol from said residue was impractical owing to stirring and foaming difficulties. Accordingly, the isopropanol-containing ar-nonylphenyl (sulfothio)acetate was employed in the following detergency, wetting-out and lathering tests.

Detergency tests were conducted according to the method described by Jay C. Harris and Earl L. Brown, J. Amer. Oil Chemists Soc. 27, 135–143 (1950), wherein the detersive efficiency of a composition is compared to a commercially available product known as "Gardinol" and reputed to be sodium lauryl sulfate. Employing this test, in water of 300 p.p.m. hardness, the ar-nonylphenyl (sulfothio)acetate was found to have 106% of the detersive efficiency of "Gardinol."

Wetting-out efficiency of the ar-nonylphenyl (sulfothio)acetate was determined according to the procedure of the Draves test of the American Association of Textile Chemists. The following wetting speeds, in seconds, were determined at the concentrations of said (sulfothio)-acetate shown below:

| | |
|---|---|
| 0.5% | Instant |
| 0.25% | 2.7 |
| 0.125% | 5.7 |
| 0.0625% | 12.9 |
| 0.031% | 180+ |

Evaluation of the lathering property was made by employing the Ross-Miles lather test of the American Society for Testing Materials. The following results were obtained in water of 300 p.p.m. hardness:

| Lather Height, ml. | |
|---|---|
| At once | After 5 minutes |
| 20.6 | 19.2 |

*Example 2*

A commercially available mixture of isomeric, branched chain nonylphenols was converted to the pentaethylene glycol monoether thereof by treating said mixture with ethylene oxide in known manner until 5 moles of ethylene oxide per mole of the phenolic mixture had been absorbed. The resulting nonylphenyl hydroxypolyethyleneoxyethyl ether, i.e., an addition product of the formula

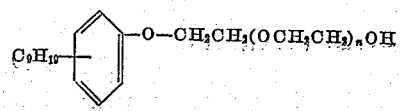

in which $n$ denotes an average of 4, was then converted to the chloroacetate as follows:

To 131 g. (0.30 mole) of said addition product there was added 31.2 g. (0.33 mole) of chloroacetic acid in 200 ml. of benzene and 10 drops of concentrated sulfuric acid. The resulting mixture was heated at reflux on a column for 16 hours while water was removed in a phase-separating head. The cooled mixture was freed of catalyst and excess acid by treating it with sodium bicarbonate and then with alumina until it was neutral when added to water. Filtration of the neutralized product and removal of benzene from the filtrate gave as residue the yellow, liquid chloroacetate of the hydroxypolyethyleneoxyethyl ether of the nonylphenol of the formula

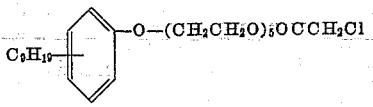

The chloroacetate was converted to the (sulfothio)-acetate as follows:

A mixture consisting of 102.3 g. (0.20 mole) of the chloroacetate, 100 ml. of ethanol, 100 ml. of water, 74.5 g. (0.30 mole) of sodium thiosulfate and 1.0 g. of sodium iodide was heated, with stirring, to a temperature of 83° C. within about 15 minutes, and heating at this temperature was continued for another 30 minutes. The whole was then allowed to stand and stratify. The upper, organic layer was recovered and dried by adding isopropanol to the reaction mixture while distilling off the water and ethanol and finally distilling off the isopropanol. The inorganic salts which had precipitated out during the distillation were filtered off and the filtrate was finally aspirated dry to give 119 g. of the light yellow, viscous, gum-like sodium (sulfothio)acetate of the pentaethylene glycol mono-ether of nonylphenol of the formula

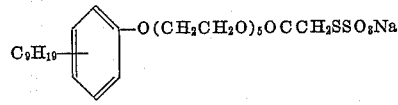

This (sulfothio)acetate was found to be a very efficient emulsifying agent in the preparation of biocidal emulsions of either isopropyl 2,4-dichlorophenoxyacetate or 2,2-bis(4-chlorophenyl)-1,1,1-trichloroethane, yielding highly stable emulsions of these compounds in both hard and soft waters.

Testing of the detersive efficiency of the (sulfothio) acetate of this example in water of 300 p.p.m. hardness by the Harris and Brown method cited in Example 1, gave a value of 104%. In the Ross-Miles lather test referred to in Example 1, in water of 300 p.p.m. hardness, the present (sulfothio)acetate gave 20.6 ml. of lather at once; after 5 minutes this value only decreased to 20.2 ml. In the Draves wetting test the present (sulfothio)acetate performed well, though not so efficiently as the nonylphenyl (sulfothio)acetate of Example 1, the value in the present instance being 4 seconds at an 0.5% concentration.

*Example 3*

Tert-dodecylphenol, wherein the dodecyl radical was derived from propylene tetramer, was reacted with ethylene oxide, in known manner to give a polyethylene glycol ether which was the addition product (having a molecular weight of 594) of 1 mole of the phenol with an average of 7.52 moles of the ethylene oxide, i.e.,

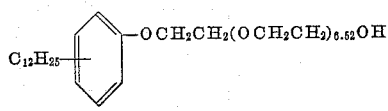

This was converted to the chloroacetate by refluxing for 18 hours a mixture consisting of 94 g. (0.158 mole) of said ether, 17.2 g. of chloroacetic acid, 300 g. of dry benzene and 10 drops of concentrated sulfuric acid, neutralizing the resulting reaction product with potassium carbonate and alumina, filtering, and distilling the filtrate to remove material boiling up to a pot temperature of 155–160° C./20 mm. The residue comprised the chloroacetate:

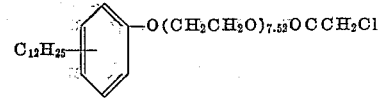

This chloroacetate was converted to the (sulfothio) acetate as follows: A mixture consisting of 80 g. (0.119 mole) of said chloroacetate, 300 g. of ethanol, 100 g. of water and 35.4 g. of sodium thiosulfate pentahydrate was heated at reflux for 40 minutes, and the reaction mixture was then allowed to attain room temperature while stirring. Part of the solvent was stripped off at reduced pressure and replaced by isopropanol and stripping was continued until the product was a solution in almost 100% isopropanol. The inorganic salts which had separated were then filtered off, and the isopropanol was stripped off, also at reduced pressure. The residue was then dried at a pot temperature of 45–50° C./18 mm. to give the substantially pure sodium (sulfothio)acetate of the 1:7.52 tert-dodecylphenol-ethylene oxide addition product.

Testing of the detersive efficiency of this (sulfothio) acetate in water of 300 p.p.m. hardness by the Harris and Brown method referred to in Example 1 gave a value of 116% as compared to "Gardinol."

*Example 4*

A commercially available branched chain octylphenol was reacted with ethylene oxide to give an addition product (having a molecular weight of 1080) in which an average of 19.8 moles of ethylene oxide had reacted with one mole of the phenol, i.e., a hydroxypolyethyleneoxyethyl ether product of the formula:

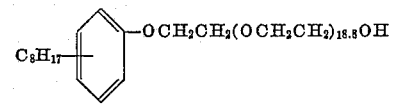

The chloroacetate of said hydroxy ether product was prepared by refluxing for 25 hours a mixture consisting of 160 g. (0.148 mole) of the addition product, 18.1 g. of chloroacetic acid, 300 g. of dry benzene and 20 drops of 96% sulfuric acid (10 drops initially and another 10 drops at the end of 17.5 hours refluxing). After neutralizing the resulting reaction mixture by treatment with potassium carbonate and alumina, filtering off the salts, stripping off the solvents from the filtrate and drying the residue at a pot temperature of 150–160° C./20 mm., there was obtained 169.8 g. of the substantially pure chloroacetate:

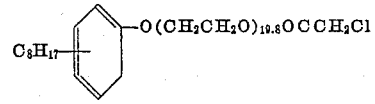

The above chloroacetate was converted to the (sulfothio) acetate by refluxing for one hour a mixture consisting of 115.6 g. (0.1 mole) of the chloroacetate, 29.8 g. (0.2 mole) of sodium thiosulfate pentahydrate, 300 g. of ethanol and 100 g. of water. The ethanol-water was then stripped off at reduced pressure and gradually replaced by isopropanol. When essentially 100% of the solvent was isopropanol, the inorganic salts were filtered off and the isopropanol stripped off the filtrate. Upon drying the residue at a pot temperature of 40–45° C./18 mm., there was obtained 125.3 g. of the substantially pure viscous liquid (sulfothio)acetate of the formula

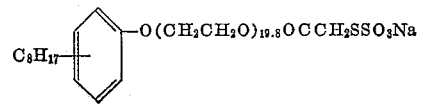

A "built" detersive composition was prepared by incorporating 15 percent by weight of the above (sulfothio) acetate in a blend of sodium pyrophosphate, sodium tripolyphosphate and soda ash. Evaluation of the detersive efficiency of said built composition by the Harris and Brown method referred to in Example 1, gave a value of 122% in water of 50 p.p.m. hardness and a value of 124% in water of 300 p.p.m. hardness.

What I claim is:

1. A (sulfothio)acetate of the formula

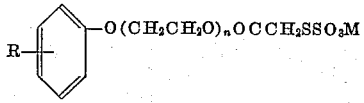

in which R is an alkyl radical of from 8 to 18 carbon atoms, $n$ is an integer of from 0 to 22 and M is selected from the class consisting of alkali metal and ammonium.

2. A (sulfothio)acetate of the formula

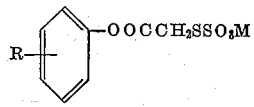

in which R is an alkyl radical of from 8 to 18 carbon atoms and M is selected from the class consisting of alkali metal and ammonium.

3. Nonylphenyl (sulfothio)acetate wherein the nonyl radical is branched-chain.

4. A (sulfothio)acetate of the formula

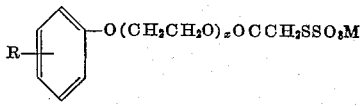

wherein R is an alkyl radical of from 8 to 18 carbon atoms, $x$ is an integer of from 1 to 22 and M is selected from the class consisting of alkali metal and ammonium.

5. A (sulfothio)acetate of the formula

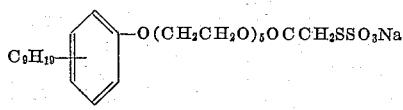

in which the $C_9H_{19}$— radical is a branched-chain nonyl radical.

6. A (sulfothio)acetate of the formula

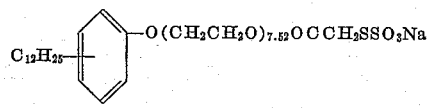

in which the $C_{12}H_{25}$— radical is a dodecyl radical derived from propylene tetramer.

7. A (sulfothio)acetate of the formula

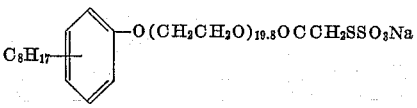

in which the $C_8H_{17}$— radical is a branched-chain octyl radical.

References Cited in the file of this patent

UNITED STATES PATENTS

| | | |
|---|---|---|
| 2,004,873 | Kirstahler | June 11, 1935 |

FOREIGN PATENTS

| | | |
|---|---|---|
| 397,445 | Great Britain | Aug. 24, 1933 |
| 758,756 | France | Jan. 23, 1934 |
| 636,260 | Germany | Oct. 15, 1936 |